United States Patent
Hoefer

(10) Patent No.: US 12,420,444 B2
(45) Date of Patent: Sep. 23, 2025

(54) TRACK SAWS WITH SELF-ADJUSTING RIB-GUIDE ASSEMBLIES AND METHODS OF OPERATING SELF-ADJUSTING RIB-GUIDE ASSEMBLIES OF TRACK SAWS

(71) Applicant: Festool GmbH, Wendlingen am Neckar (DE)

(72) Inventor: Tobias Hoefer, Urbach (DE)

(73) Assignee: Festool GmbH (DE)

( * ) Notice: Subject to any disclaimer, the term of this patent is extended or adjusted under 35 U.S.C. 154(b) by 367 days.

(21) Appl. No.: 17/919,614

(22) PCT Filed: Jun. 23, 2021

(86) PCT No.: PCT/EP2021/067122
§ 371 (c)(1),
(2) Date: Oct. 18, 2022

(87) PCT Pub. No.: WO2021/259989
PCT Pub. Date: Dec. 30, 2021

(65) Prior Publication Data
US 2023/0166425 A1 Jun. 1, 2023

Related U.S. Application Data

(60) Provisional application No. 63/044,034, filed on Jun. 25, 2020.

(51) Int. Cl.
*B27B 5/30* (2006.01)
*B23D 47/02* (2006.01)
(Continued)

(52) U.S. Cl.
CPC ............ *B23D 47/12* (2013.01); *B23D 47/02* (2013.01); *B23D 59/003* (2013.01); *B27B 5/30* (2013.01);
(Continued)

(58) Field of Classification Search
CPC ...... B23D 47/02; B23D 47/12; B23D 59/003; B27B 9/02; B27B 5/32; B27B 5/30; B27B 9/04
(Continued)

(56) References Cited

U.S. PATENT DOCUMENTS

| 4,677,750 A | 7/1987 | Maier et al. |
| 2006/0283024 A1* | 12/2006 | Wilson ...................... B27B 9/04 30/390 |

(Continued)

FOREIGN PATENT DOCUMENTS

| CN | 1872469 B | 6/2010 |
| CN | 103418836 A * | 12/2013 ........... B25H 1/0078 |

(Continued)

OTHER PUBLICATIONS

Translation, CN 1033418836 (Year: 2025).*
(Continued)

*Primary Examiner* — Nhat Chieu Q Do
(74) *Attorney, Agent, or Firm* — Lucian Wayne Beavers; Patterson Intellectual Property Law, PC

(57) ABSTRACT

Track saws with self-adjusting rib-guide assemblies and methods of operating self-adjusting rib-guide assemblies of track saws are disclosed herein. The track saws include a motor, an arbor, and a base plate. The base plate defines an arbor-facing side and an arbor-opposed side. The base plate includes a rib-receiving channel and a self-adjusting rib-guide assembly. The self-adjusting rib-guide assembly at least partially defines the rib-receiving channel and is configured to automatically accommodate a range of raised rib transverse widths. The methods include positioning a raised elongate rib of the track within a rib-receiving channel of a base plate of the track saw. During the positioning, the methods also include establishing a contact force between the raised elongate rib and the self-adjusting rib-guide assembly. Responsive to the contact force, the methods further include moving at least a portion of the self-adjusting rib-guide assembly relative to a remainder of the track saw.

12 Claims, 14 Drawing Sheets

(51) Int. Cl.
  *B23D 47/12* (2006.01)
  *B23D 59/00* (2006.01)
  *B27B 5/32* (2006.01)
  *B27B 9/02* (2006.01)
  *B27B 9/04* (2006.01)
  *B27G 19/04* (2006.01)

(52) U.S. Cl.
  CPC .................. *B27B 5/32* (2013.01); *B27B 9/02* (2013.01); *B27B 9/04* (2013.01); *B27G 19/04* (2013.01)

(58) Field of Classification Search
  USPC .................................................. 83/13; 30/391
  See application file for complete search history.

(56) References Cited

U.S. PATENT DOCUMENTS

| | | | |
|---|---|---|---|
| 2012/0079931 A1 | 4/2012 | Hansen | |
| 2015/0165637 A1 | 6/2015 | Sinzig et al. | |
| 2017/0021466 A1* | 1/2017 | Hiroshima | B27B 9/00 |

FOREIGN PATENT DOCUMENTS

| | | | | |
|---|---|---|---|---|
| CN | 205312467 U | 6/2016 | | |
| CN | 205309881 A | 12/2016 | | |
| CN | 210256539 U | 4/2020 | | |
| DE | 102006025137 A1 * | 1/2007 | ............... | B27B 9/02 |
| DE | 202020101228 U1 | 7/2020 | | |
| JP | 2006334886 A | 12/2006 | | |
| JP | 2017196853 A | 11/2017 | | |
| WO | 2015014038 A1 | 2/2015 | | |

OTHER PUBLICATIONS

Translation, DE102006025137 (Year: 2025).*
The International Search Report dated Sep. 17, 2021 from the corresponding PCT/EP2021/067122 (not prior art).
Japan Office Action for corresponding patent application No. 2022-577481, dated Feb. 6, 2024, 13 pages including English translation (not prior art).
China Office Action for corresponding patent application No. CN 2025012402023220, dated Jan. 24, 2025, 12 pages (not prior art).
Japan Office Action for corresponding patent application No. 2022-577481, dated Sep. 17, 2024, 4 pages including English translation (not prior art).

* cited by examiner

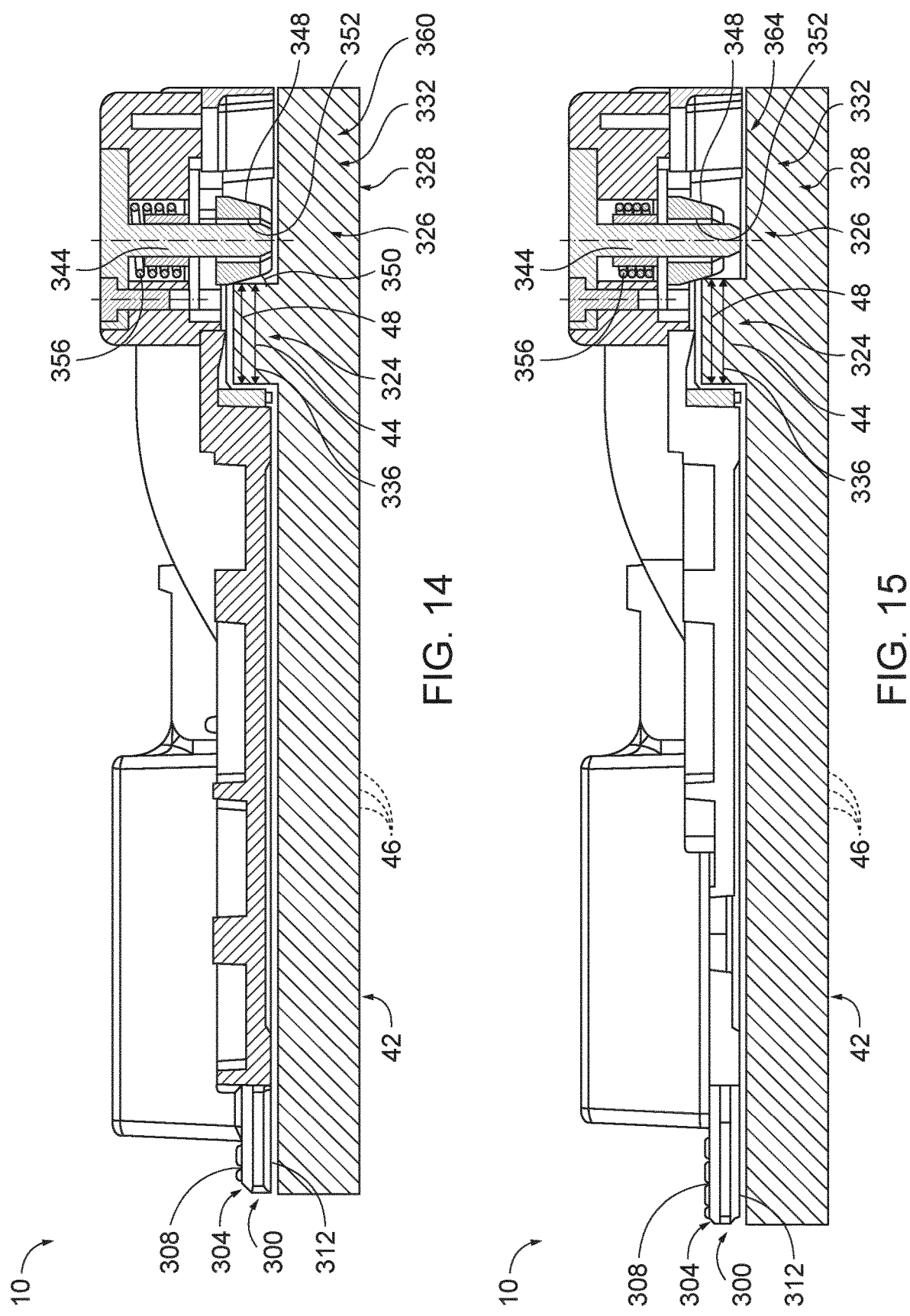

US 12,420,444 B2

TRACK SAWS WITH SELF-ADJUSTING RIB-GUIDE ASSEMBLIES AND METHODS OF OPERATING SELF-ADJUSTING RIB-GUIDE ASSEMBLIES OF TRACK SAWS

RELATED APPLICATION

This application is a 371 national stage entry of PCT/EP2021/067122 filed on Jun. 23, 2021, which claims priority to U.S. Provisional Patent Application No. 63/044,034, which was filed on Jun. 25, 2020, and the complete disclosure of which is hereby incorporated by reference.

FIELD OF THE DISCLOSURE

The present disclosure is directed generally to track saws with self-adjusting rib-guide assemblies and/or to methods of operating self-adjusting rib-guide assemblies of track saws.

BACKGROUND OF THE DISCLOSURE

Circular saws may be configured to rotate a circular saw blade, which may be utilized to cut a workpiece. Handheld circular saws are one type of circular saw that generally is small, is portable, and/or is held and/or manipulated by a user when utilized to cut the workpiece. While convenient, handheld circular saws generally provide several distinct motional degrees of freedom, which must be carefully controlled by the user. As such, a quality of cut generated by a given handheld circular saw may depend strongly on a level of experience, expertise, dexterity, and/or strength of the user.

Track saws are a type of handheld circular saw that utilize a separate track, which may be clamped to the workpiece, to guide the track saw while the track saw is utilized to cut the workpiece. The clamped track constrains motion of the track saw, thereby permitting both novice and experienced users to produce higher quality and/or straighter cuts within the workpiece. While quite effective, track saws may rely upon relatively tight tolerances between the track saw and the track in order to produce precise cuts in the workpiece. Some track saws include a manual adjustment mechanism, which may be utilized to manually adjust the tolerances between the track saw and the track. However, the user may not always recognize that an adjustment should be made. In addition, variations in dimensions of the track may make it difficult, if not impossible, for the user to ensure a desired tolerance along an entirety of a cut, especially when the cut extends along a series of interconnected segments of the track. Thus, there exists a need for track saws with self-adjusting rib-guide assemblies and/or for methods of operating self-adjusting rib-guide assemblies.

SUMMARY OF THE DISCLOSURE

Track saws with self-adjusting rib-guide assemblies and methods of operating self-adjusting rib-guide assemblies of track saws are disclosed herein. The track saws include a motor, an arbor, and a base plate. The motor includes a motor shaft configured to rotate about a shaft rotational axis. The arbor is configured to attach a circular saw blade to the track saw and to receive a torque from the motor when the motor shaft rotates about the shaft rotational axis. The base plate defines an arbor-facing side and an arbor-opposed side. The arbor is operatively attached to the arbor-facing side. The base plate includes a rib-receiving channel and a self-adjusting rib-guide assembly. The rib-receiving channel is defined on the arbor-opposed side of the base plate and is configured to receive a raised elongate rib of a track. The self-adjusting rib-guide assembly at least partially defines the rib-receiving channel and is configured to automatically adjust for a range of raised rib transverse widths.

The methods include positioning a raised elongate rib of a track within a rib-receiving channel of a self-adjusting rib-guide assembly of a base plate of the track saw. During the positioning, the methods also include establishing a contact force between the raised elongate rib of the track and the self-adjusting rib-guide assembly. Responsive to the contact force, the methods further include moving at least a portion of the self-adjusting rib-guide assembly relative to a remainder of the track saw to adjust for a raised rib transverse width of the raised elongate rib.

BRIEF DESCRIPTION OF THE DRAWINGS

FIG. 14 is a transverse cross-sectional view of the base plate of FIG. 13 illustrating a guide roller of the self-adjusting rib-guide assemblies in an extended state.

FIG. 15 is a transverse cross-sectional view of the base plate of FIG. 13 illustrating a guide roller of the self-adjusting rib-guide assemblies in a retracted state.

DETAILED DESCRIPTION AND BEST MODE OF THE DISCLOSURE

Figure 1:
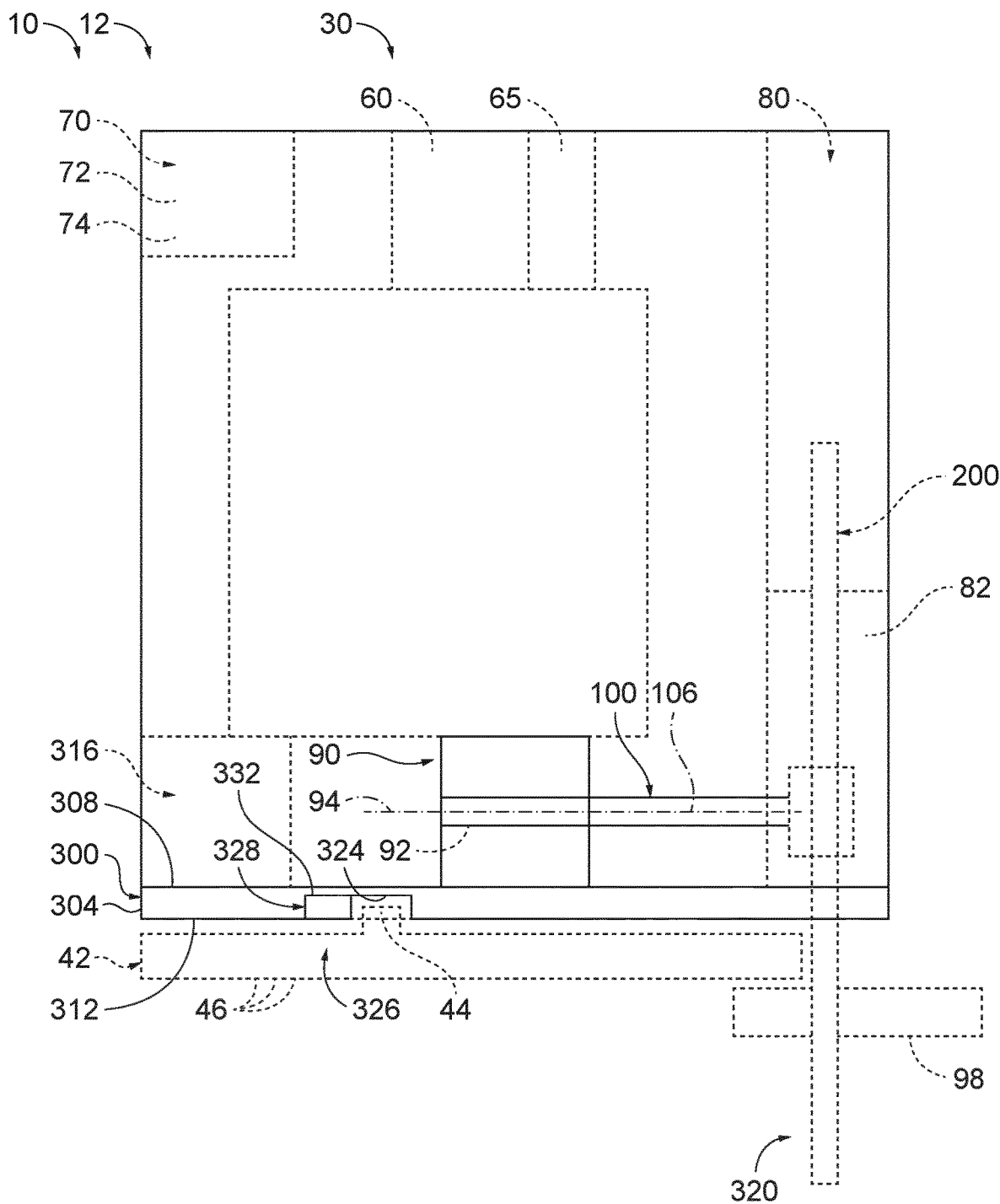
FIG. 1 is a schematic illustration of examples of a track saw according to the present disclosure.

FIGS. 1-15 provide examples of track saws 10 and/or components thereof, according to the present disclosure. Elements that serve a similar, or at least substantially similar, purpose are labeled with like numbers in each of FIGS. 1-15, and these elements may not be discussed in detail herein with reference to each of FIGS. 1-15. Similarly, all elements may not be labeled in each of FIGS. 1-15, but reference numerals associated therewith may be utilized herein for consistency. Elements, components, and/or features that are discussed herein with reference to one or more of FIGS. 1-15 may be included in and/or utilized with any of FIGS. 1-15 without departing from the scope of the present disclosure.

In general, elements that are likely to be included in a particular embodiment are illustrated in solid lines, while elements that are optional are illustrated in dashed lines. However, elements that are shown in solid lines may not be essential to all embodiments and, in some embodiments, may be omitted without departing from the scope of the present disclosure.

Figure 2:
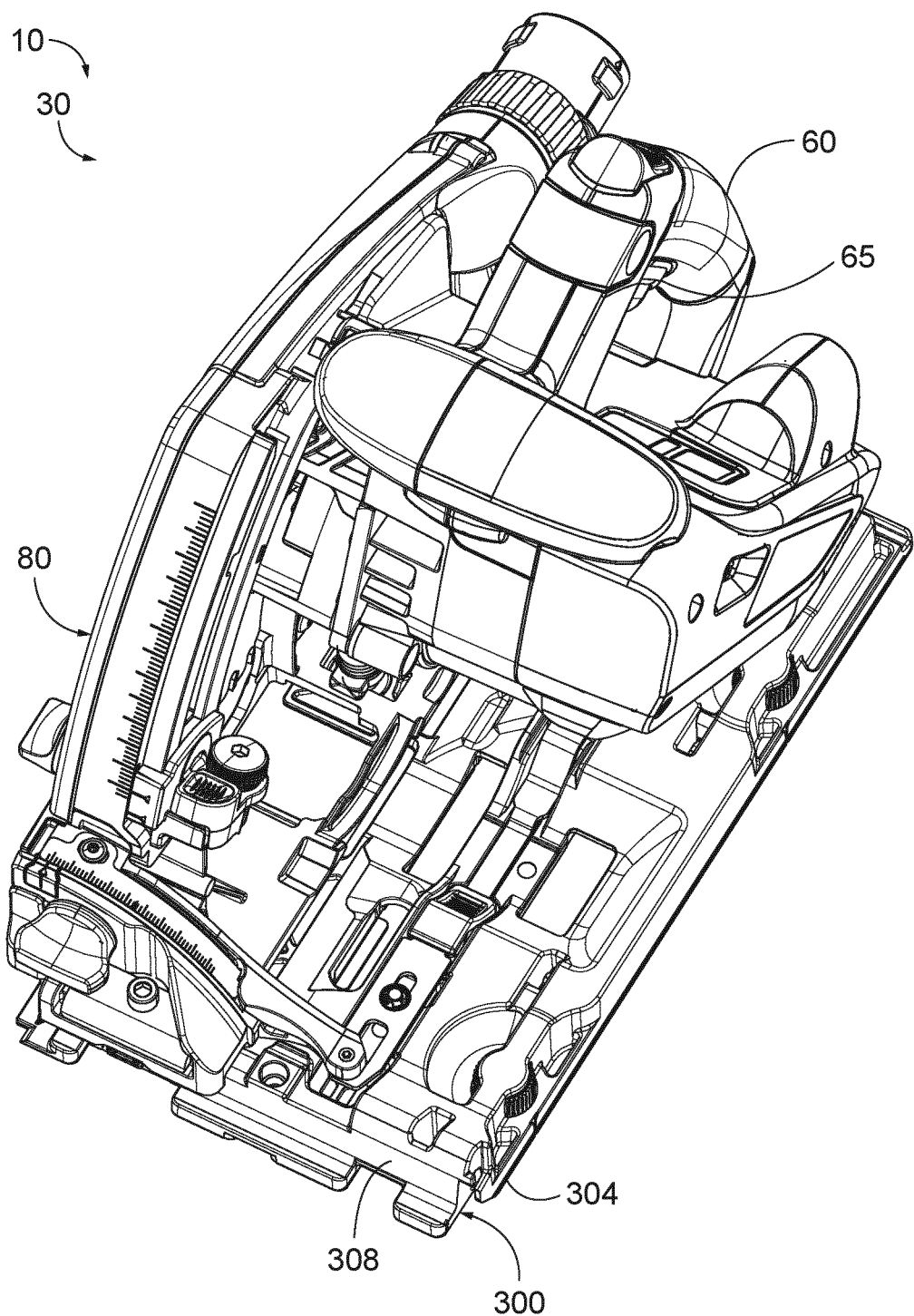
FIG. 2 is a less schematic top profile view of an example of a track saw according to the present disclosure.
Figure 3:
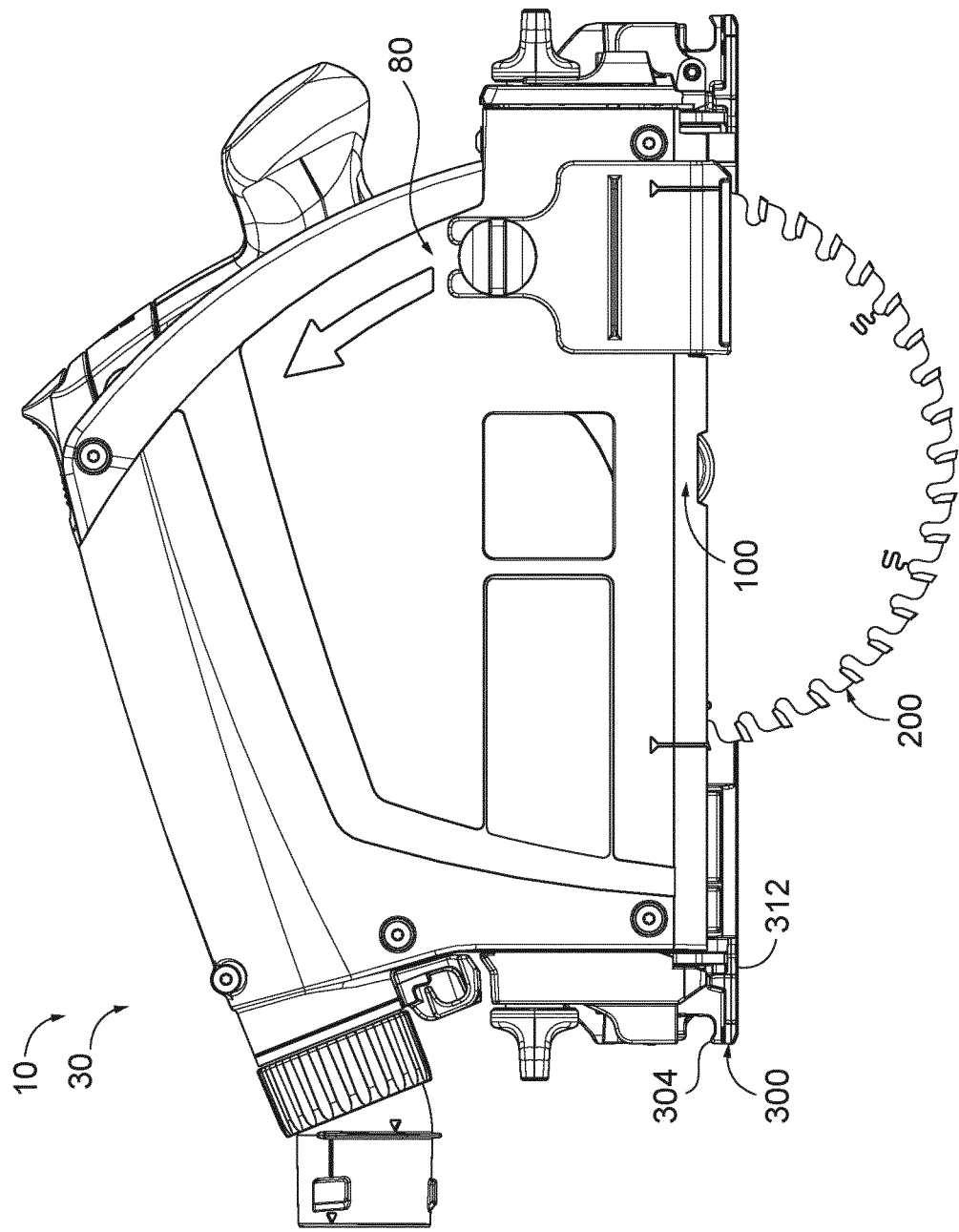
FIG. 3 is a less schematic right side view of an example of a track saw according to the present disclosure.
Figure 4:
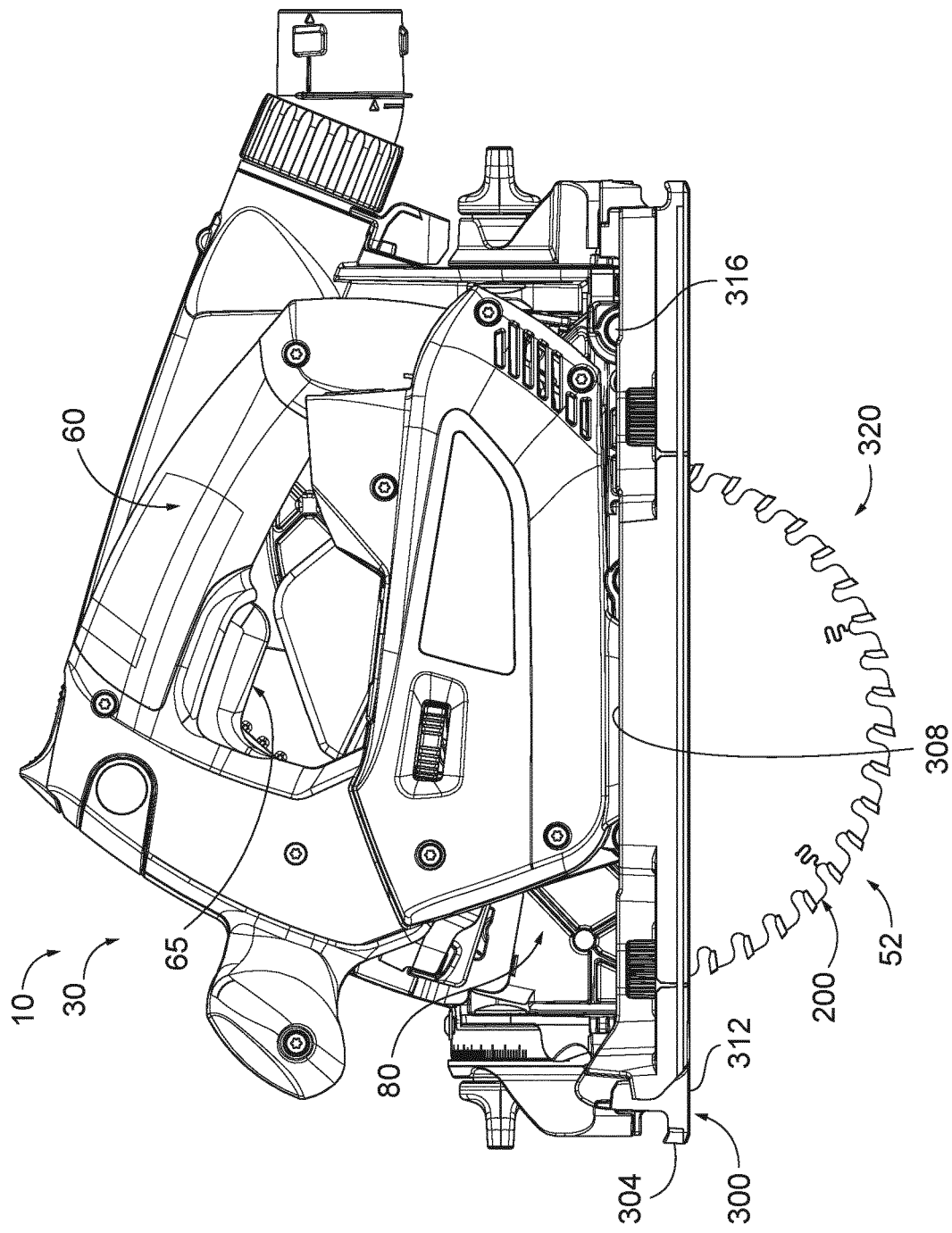
FIG. 4 is a less schematic left side view of an example of a track saw according to the present disclosure.
Figure 5:
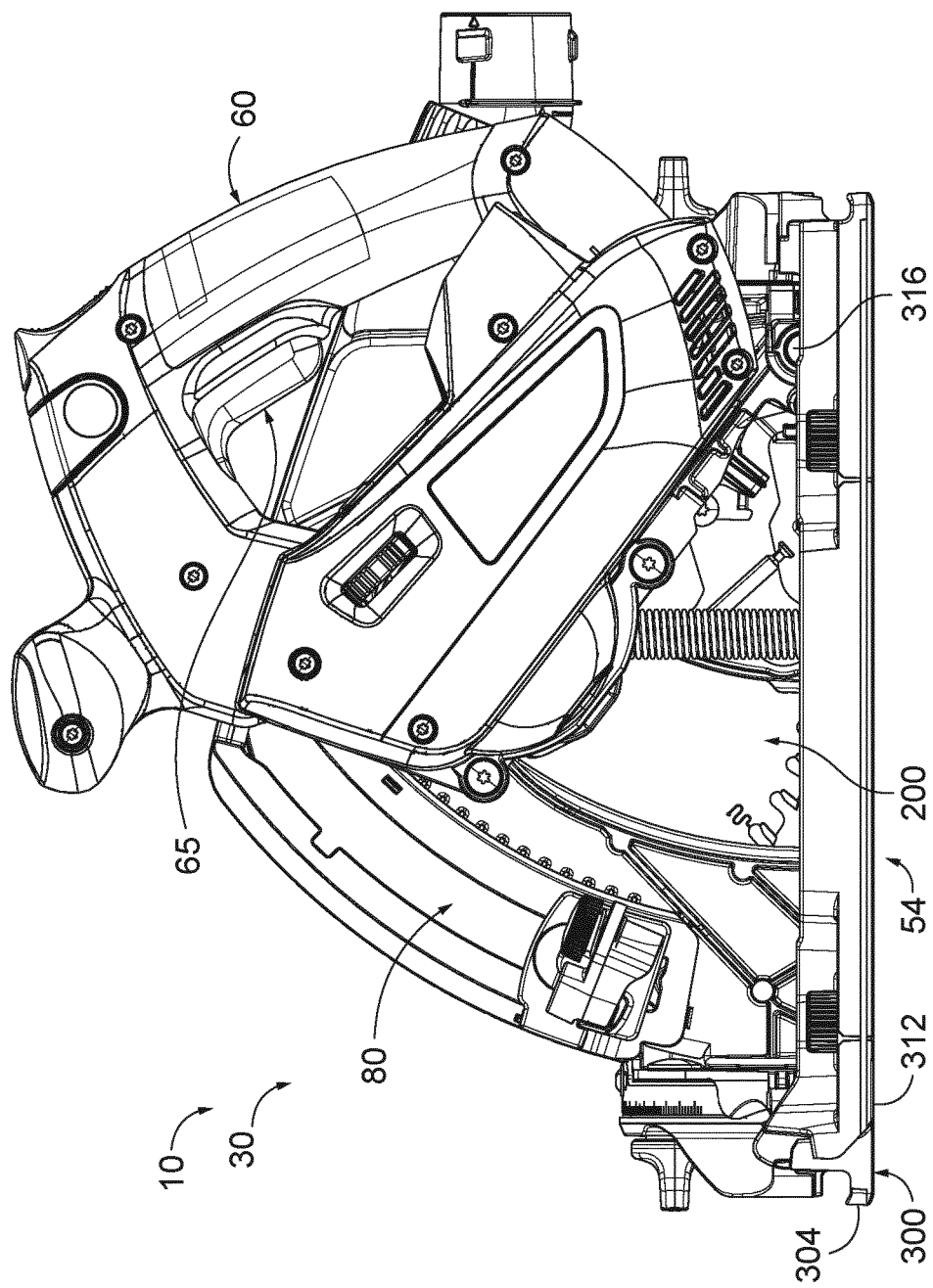
FIG. 5 is another less schematic left side view of an example of a track saw according to the present disclosure.
Figure 6:
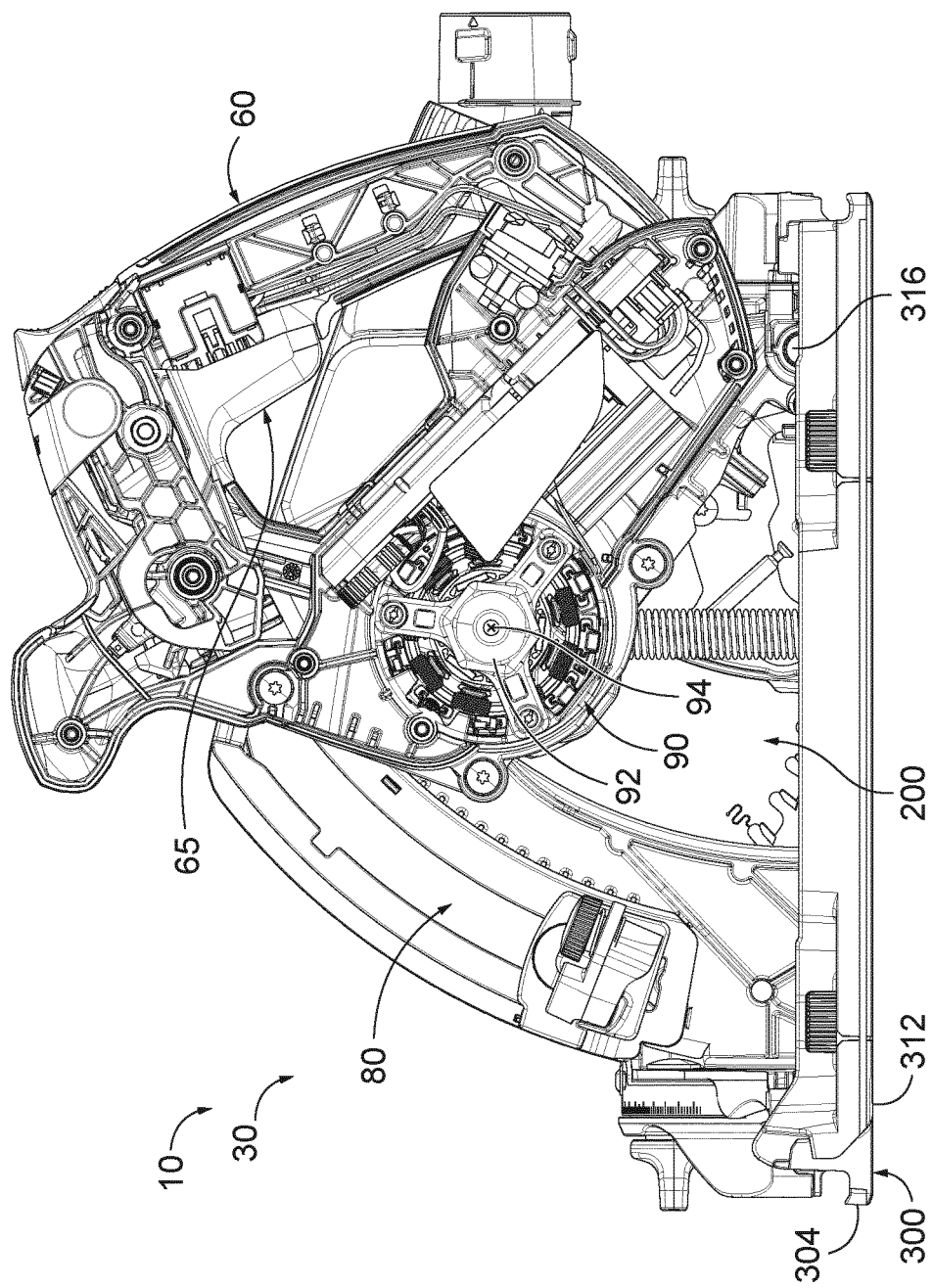
FIG. 6 is another less schematic left side view of an example of a track saw according to the present disclosure.
Figure 7:
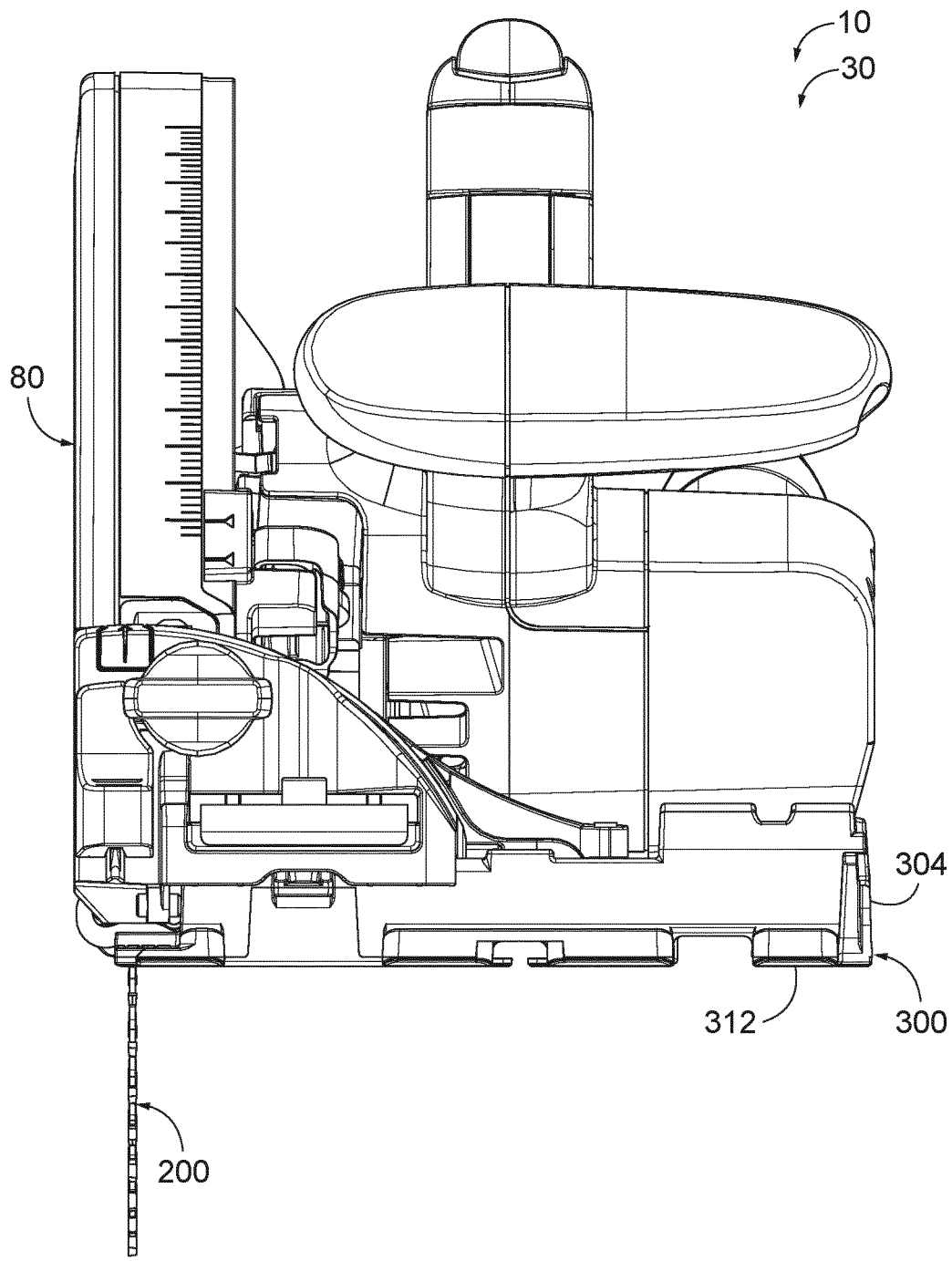
FIG. 7 is a less schematic front view of an example of a track saw according to the present disclosure.
Figure 8:
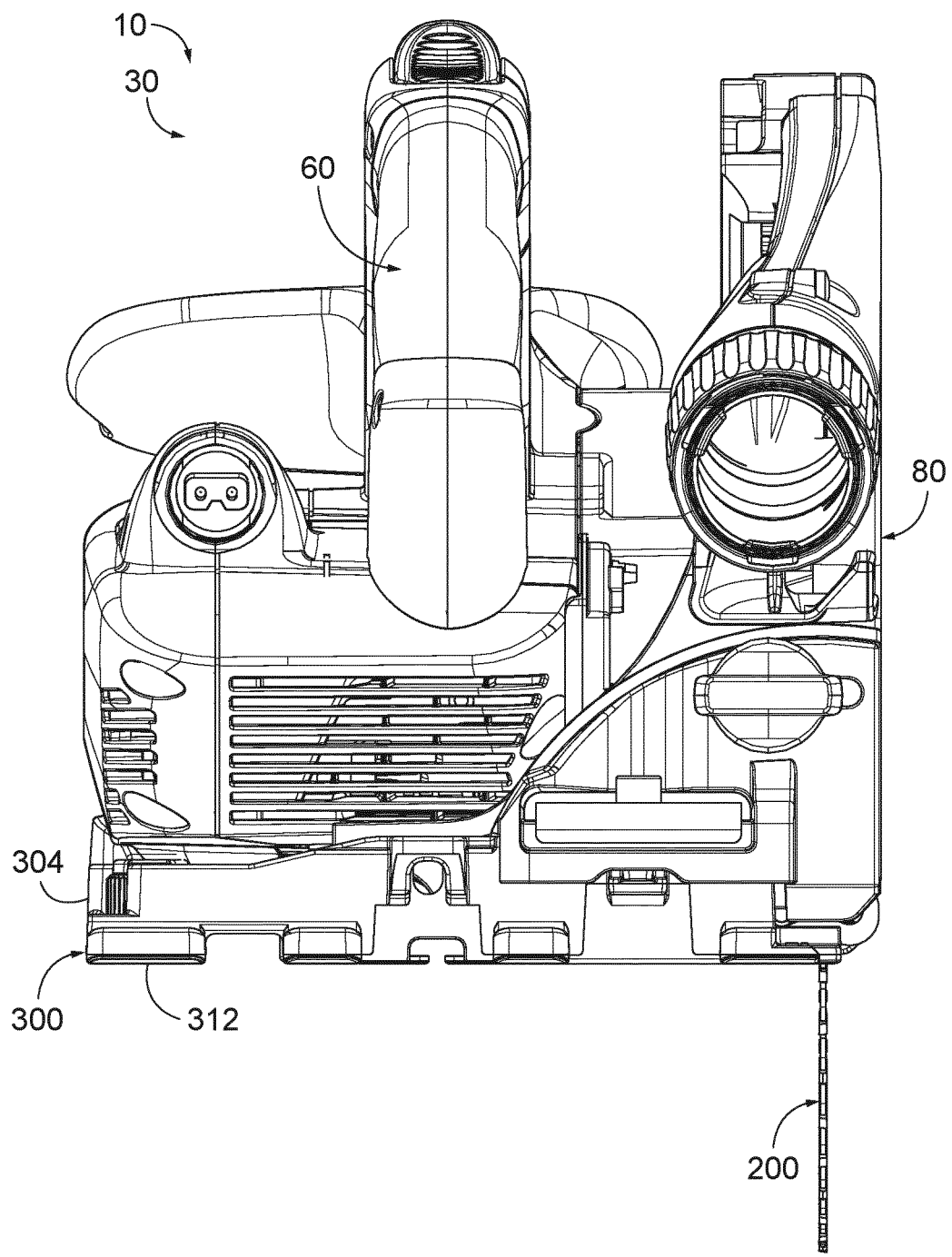
FIG. 8 is a less schematic rear view of an example of a track saw according to the present disclosure.
Figure 9:
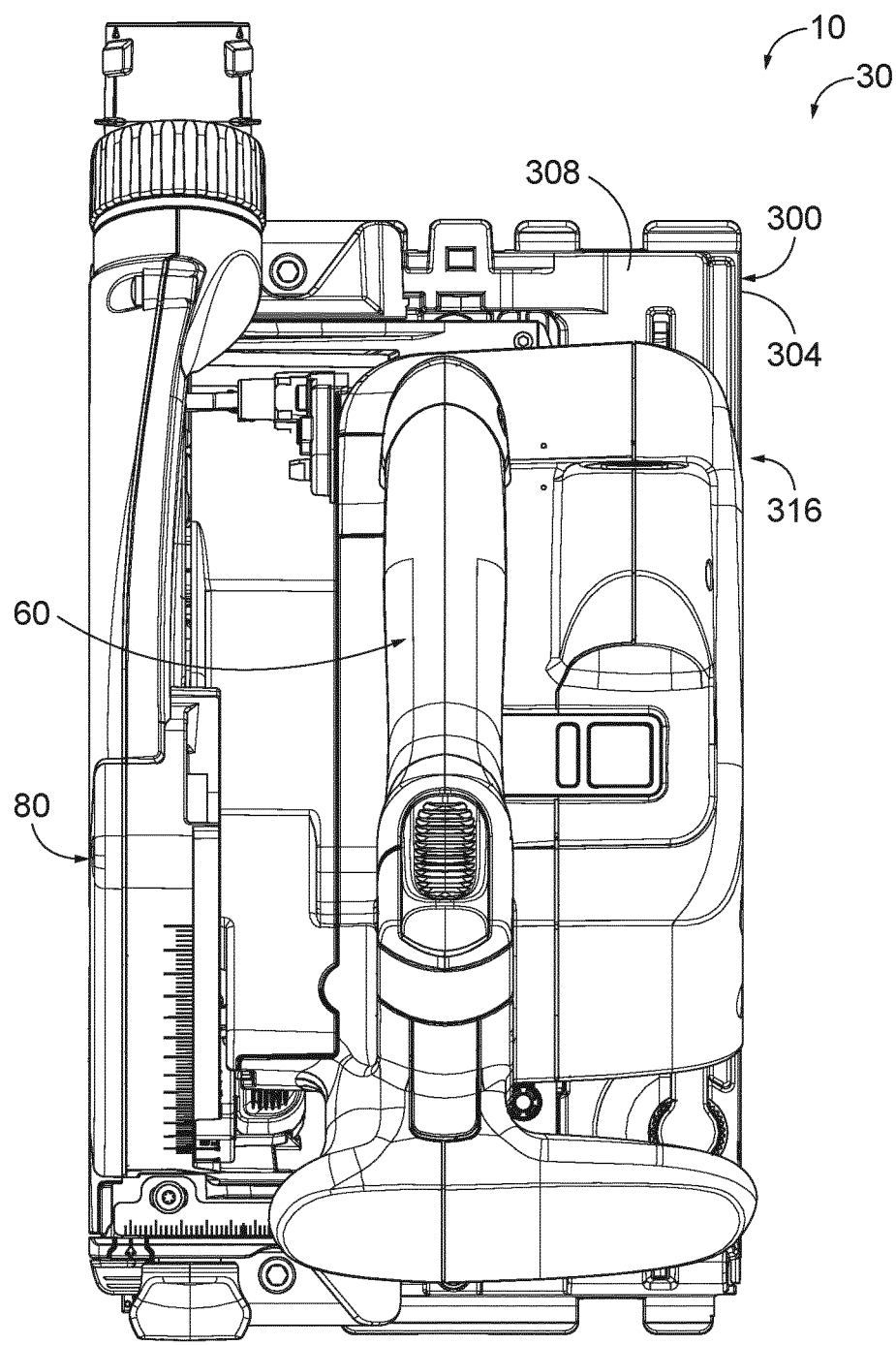
FIG. 9 is a less schematic top view of an example of a track saw according to the present disclosure.
Figure 10:
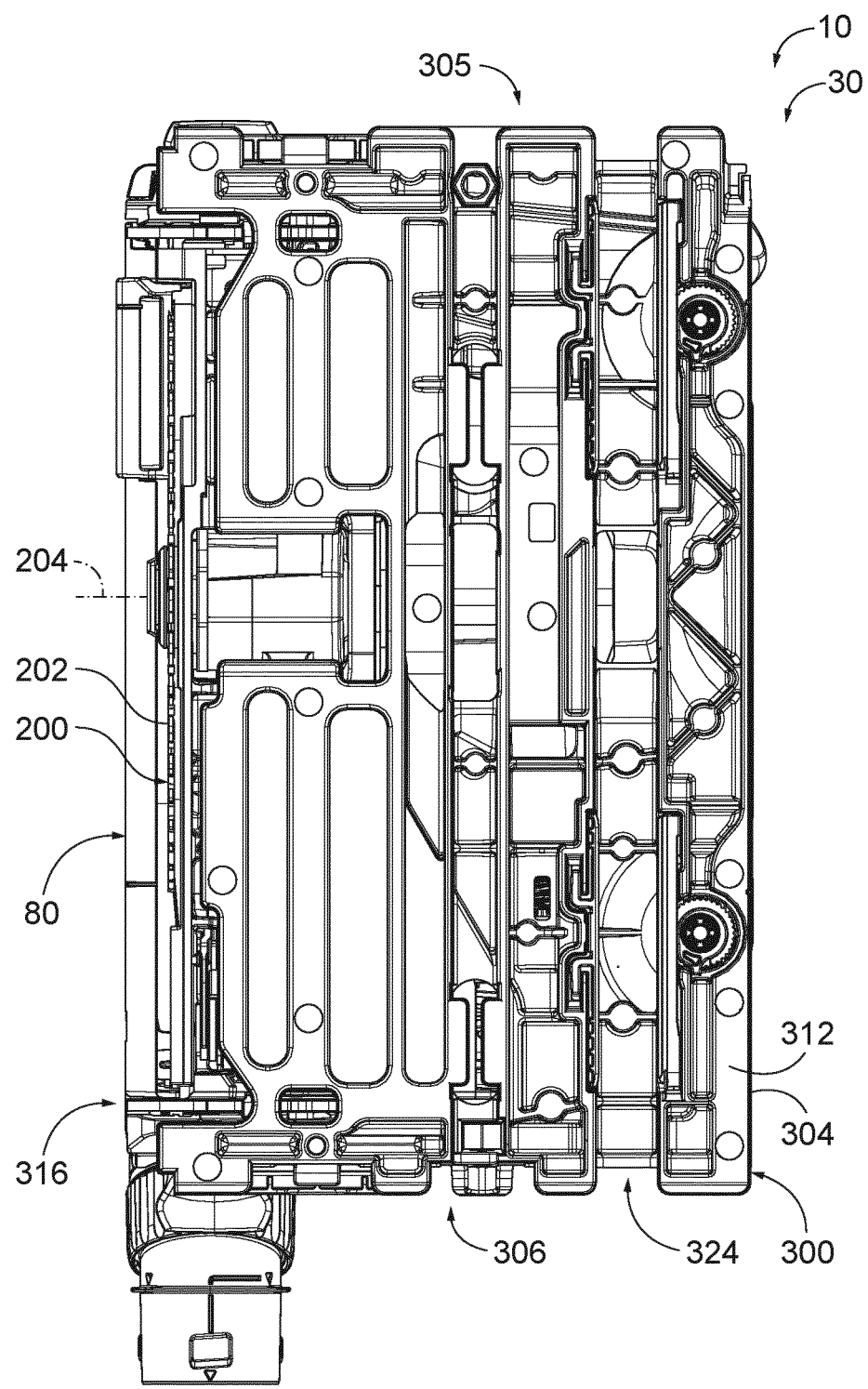
FIG. 10 is a less schematic bottom view of an example of a track saw according to the present disclosure.
Figure 11:
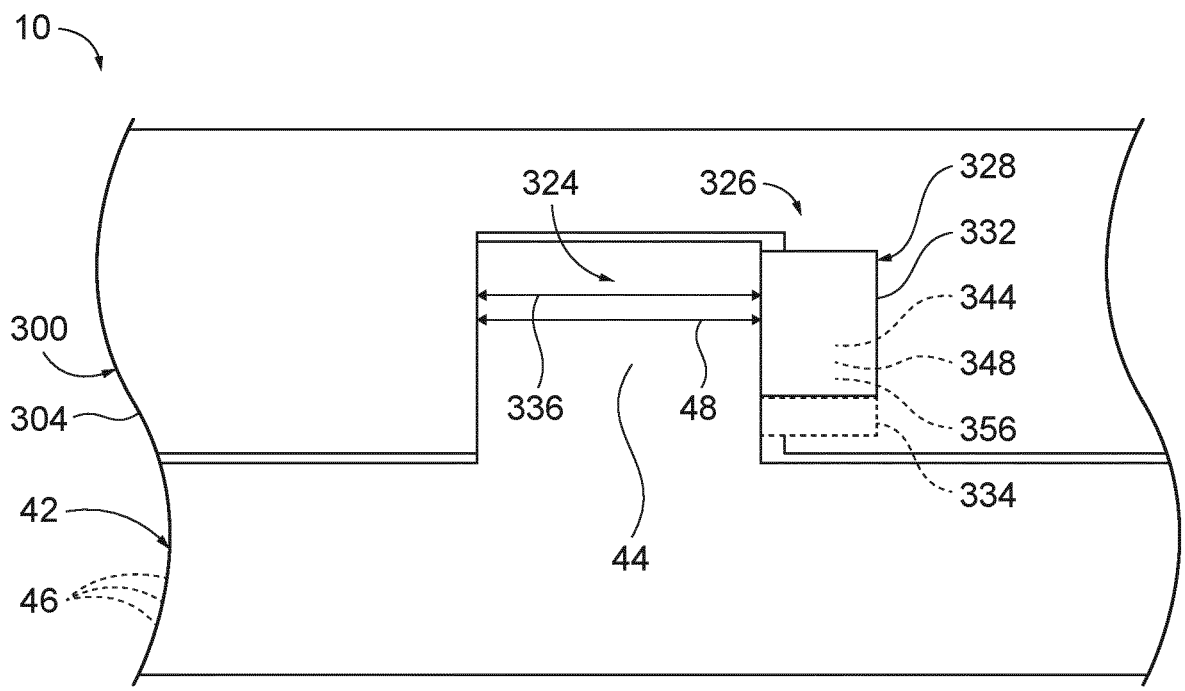
FIG. 11 is a schematic illustration of examples of a region of base plates that include self-adjusting rib-guide assemblies, according to the present disclosure.
Figure 12:
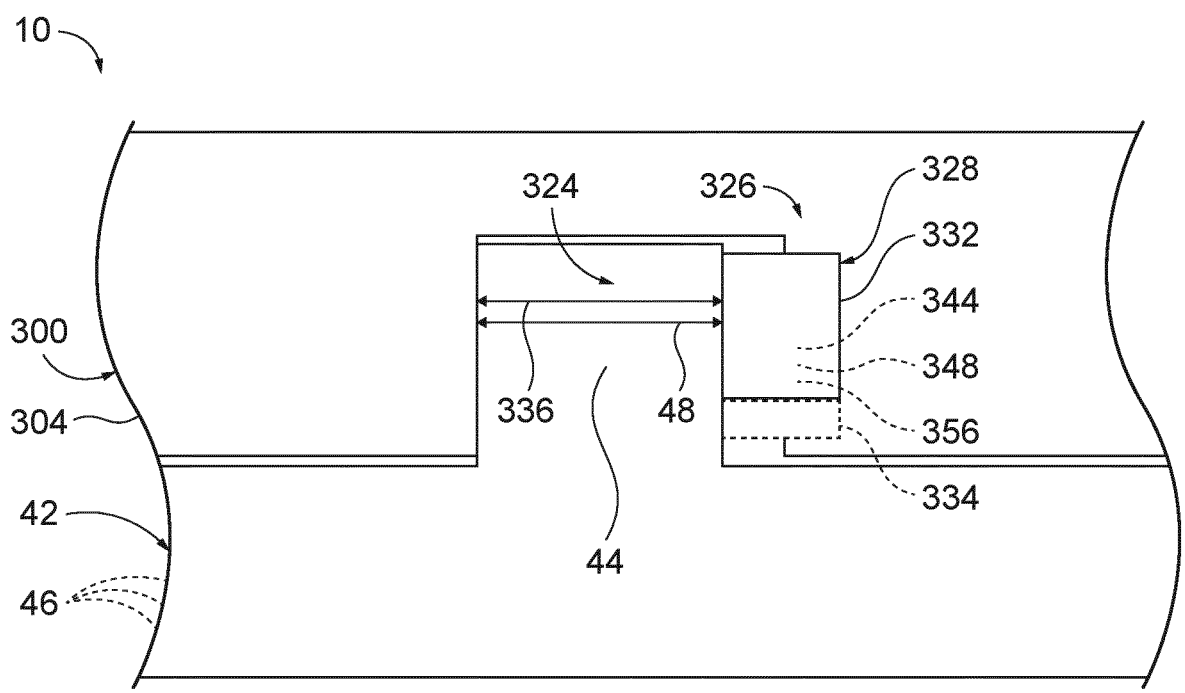
FIG. 12 is a schematic illustration of examples of a region of base plates that include self-adjusting rib-guide assemblies, according to the present disclosure.
Figure 13:
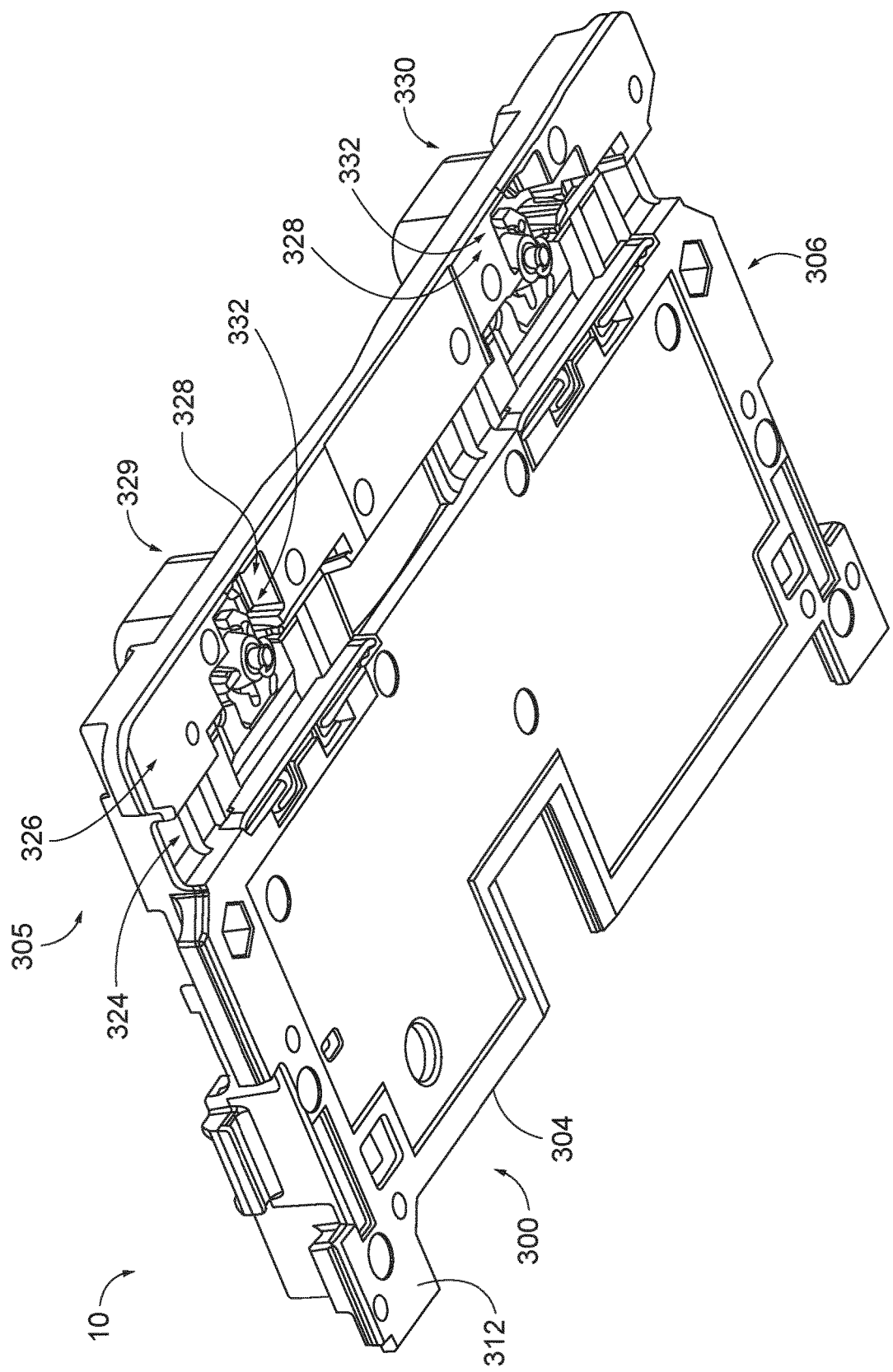
FIG. 13 is a profile view illustrating an arbor-opposed side of an example of a base plate that includes self-adjusting rib-guide assemblies, according to the present disclosure.

FIG. 1 is a schematic illustration of examples of circular saws in the form of track saws 10 according to the present disclosure, while FIGS. 2-10 are less schematic illustrations of an example of a track saw 10, according to the present disclosure, that also is a plunge saw 30. FIGS. 11-15 are illustrations of a base plate 304 of a track saw 10 that includes a self-adjusting rib guide assembly 332, according to the present disclosure. More specifically, FIG. 2 illustrates a top profile view of track saw 10, and FIG. 3 illustrates a right side view of track saw 10. FIG. 4 illustrates a left side view of track saw 10 illustrating the track saw in a fully plunged orientation 52, FIG. 5 illustrates the left side view of track saw 10 illustrating the track saw in a fully retracted orientation 54, and FIG. 6 illustrates the left side view of FIG. 5 with several covers removed. FIG. 7 is a front view of track saw 10, FIG. 8 is a rear view of track saw 10, FIG. 9 is a top view of track saw 10, and FIG. 10 is a bottom view of track saw 10. FIGS. 11-12 are schematic illustrations of examples of a region of base plates 304 of track saws 10 that include self-adjusting rib-guide assemblies 332, according to the present disclosure, with the region of base plates 304 illustrated engaging with a schematically illustrated track 42. FIG. 13 is a profile view illustrating an arbor-opposed side of an example of a base plate 304 that includes self-adjusting rib-guide assemblies 332, according to the present disclosure, FIG. 14 is a transverse cross-sectional view of base plate 304 of FIG. 13 illustrating a guide roller 348 of the self-adjusting rib-guide assemblies in an extended state 360, and FIG. 15 is a transverse cross-sectional view of the base plate of FIG. 13 illustrating guide roller 348 of the self-adjusting rib-guide assemblies in a retracted state 364. Base plate 304 illustrated in the example of FIGS. 13-15 may differ from, or include different structure than, base plates 304 illustrated in the example of FIGS. 2-10.

As illustrated collectively by FIGS. 1-15, track saws 10 include a motor 90 that includes a motor shaft 92 configured to rotate about a shaft axis of rotation 94. Track saws 10 also include an arbor 100 configured to receive a torque from motor 90 when motor shaft 92 rotates about the shaft rotational axis. Receipt of the torque may cause arbor 100 to rotate about an arbor rotational axis 106, which also may be referred to herein as and/or may be a circular saw rotational axis 106, as illustrated in FIG. 1. As also illustrated in dashed lines in FIG. 1 and in solid lines in FIGS. 3-8 and 10, track saws 10 also may include a circular saw blade 200. Circular saw blade 200, when present, may be operatively attached to the track saw via arbor 100 and/or may be configured for rotational movement with the arbor. Rotation of circular saw blade 200 may facilitate cutting of a workpiece 98 with the circular saw blade, as schematically illustrated in FIG. 1.

Track saws 10 may be any suitable type or style of track saw that is adapted, configured, designed, and/or constructed to utilize a circular saw blade 200 to cut the workpiece and/or that may utilize track 42 to improve a quality and/or precision of cuts produced within the workpiece. Examples of track saws 10 include track saws 10 in the form of a handheld track saw 12 and/or a plunge saw 30. In some examples, track saws 10 may include structures and/or features from both of the above saws, and/or may incorporate functionality of both of the above saws. As an example, and as discussed in more detail herein, a given track saw 10 may be and/or may incorporate functionality of handheld track saw 12 and/or of plunge saw 30. Track saws 10 according to the present disclosure thus may include one or more of the features disclosed herein, but track saws 10 are not required to include all of the features disclosed herein.

Motor 90 may include any suitable structure that may provide the motive force for rotation of motor shaft 92 and/or for actuation of circular saw blade 200. Examples of motor 90 include an electric motor, an AC electric motor, a DC electric motor, a brushless DC motor, a variable-speed motor, and/or a single-speed motor.

As illustrated in dashed lines in FIG. 1 and in solid lines in FIGS. 2, 4-6, and 8-9, track saws 10 may include a gripping region 60 that is configured to be gripped and/or held by a user during operation of the track saw. Gripping region 60, when present, also may be referred to herein as and/or may be a handle, or hand grip.

As also illustrated in dashed lines in FIG. 1 and in solid lines in FIGS. 2 and 4-6, track saws 10 may include at least one switch 65. Switch(es) 65, when present, may be configured to be selectively actuated by the user of the track saw, such as to enable and/or permit electric current to be provided to at least one other component of the track saw and/or to permit powered operation of the at least one other component of the track saw. As examples, selective actuation of switch(es) 65 may be utilized to enable operation of a motor controller of the track saw, to selectively apply an electric current to motor 90, to enable the motor controller to selectively apply the electric current to the motor, and/or to permit, or direct, the motor to provide the motive force for rotation of the motor shaft. In some examples, the electric current may be utilized to power, or to directly power, at least one other component of the track saw, such as motor 90. In some such examples, the electric current also may be referred to herein as an electric power signal. In some examples, the electric current may be an electric data signal that is sent to at least one other component of the track saw, such as the motor controller of the track saw. In some such examples, the electric current also may be referred to herein as a data signal and/or as an electric data signal. Examples of switch 65 include an electrical switch, a normally open electrical switch, a momentary electrical switch, and/or a locking momentary electrical switch.

As also illustrated in solid lines in FIGS. 1-15, track saws 10 also include a workpiece support 300 in the form of a base plate 304. Workpiece support 300 may be configured to support workpiece 98 and/or to position the track saw relative to the workpiece when the workpiece is cut or otherwise acted upon by the implement, as illustrated in FIG. 1.

Track saws 10 may include any suitable power source, and corresponding power supply structures 70, for powering motor 90. Examples of the power supply structures include a power cord 72 and/or a battery 74, as illustrated in FIG. 1.

As also illustrated in dashed lines in FIG. 1 and in solid lines in FIGS. 2-10, track saws 10 may include a blade guard 80. Blade guard 80, when present, may be configured to cover, to house, and/or to contain at least a region of circular saw blade 200, such as to prevent, or to decrease a potential for, contact between the user and the circular saw blade. In some examples of track saws 10, blade guard 80 may include a retractable region 82, as illustrated in FIG. 1. The retractable region may be configured to fold, rotate, and/or otherwise retract when the track saw is utilized to cut the workpiece. Retractable region 82 additionally or alternatively may be referred to as a retracting region 82 and/or a collapsing region 82.

In some examples, and as discussed, track saws 10 may be (i.e., include structures and features of) a plunge saw 30. In examples of track saws 10 that are or include the functionality of plunge saw 30, arbor 100 may be configured to move relative to workpiece support 300, such as to selectively vary a region of circular saw blade 200 that projects from the workpiece support and/or to selectively vary a depth-of-cut of the track saw. For example, arbor 100 may be configured to pivot relative to workpiece support 300, as illustrated by the transition between the configuration that is illustrated in FIGS. 3-4 and 7-8, and the configuration that is illustrated in FIGS. 5-6.

As a more specific example, workpiece support 300 may include and/or be base plate 304, which may define an arbor-facing side 308 and an arbor-opposed side 312. Arbor 100 may be operatively attached to arbor-facing side 308 of base plate 304 with, via, and/or utilizing a base plate pivot 316. Stated another way, arbor-facing side 308 of base plate 304 may face toward arbor 100. In such examples, arbor 100 and base plate 304 may be configured to rotate, relative to one another, about base plate pivot 316, such as to selectively vary a region 320 of circular saw blade 200 that extends on arbor-opposed side 312 of the base plate, as perhaps best illustrated by the transition from the configuration that is illustrated in FIG. 4, which illustrates a fully plunged orientation 52, to the configuration that is illustrated in FIG. 5, which illustrates a fully retracted orientation 54. Stated another way, arbor 100 may be configured to pivot relative to workpiece support 300 throughout a range of relative orientations, or relative angles, that may be bounded by the fully plunged orientation and the fully retracted orientation. For each relative orientation in this range of relative orientations, circular saw blade 200 may extend on arbor-opposed side 312 by a corresponding amount, thereby providing a corresponding maximum depth-of-cut for the track saw.

Base plate 304 of track saws 10 includes a rib-receiving channel 324, which may be configured to receive a raised elongate rib 44 of a track 42, as perhaps best illustrated in FIGS. 1, 11-12, and 14-15. Track 42 also may be referred to herein as an elongate track 42 and may be formed from one or more elongate track segments, or track sections, 46, which may be operatively attached to one another to define any suitable track length. During operation of track saws 10, track 42 may be operatively attached, or clamped, to workpiece 98 such that an edge of the track corresponds to a desired cut line for the track saw. Subsequently, the track saw may be positioned, relative to the track, such that raised elongate rib 44 is positioned within rib-receiving channel 324; and the track saw then may be translated along at least a fraction of the length of the elongate track, thereby producing a straight cut along the desired cut line.

FIGS. 11-15 emphasize rib guide assemblies 328 in the form of self-adjusting rib-guide assemblies 332, according to the present disclosure. FIGS. 11-15 may include and/or be more detailed and/or specific views of components, regions, and/or features of track saws 10, according to the present disclosure, such as track saws 10 of FIGS. 1-10. With this in mind, any of the structures, functions, and/or features that are disclosed herein with reference to any one of FIGS. 1-15 may be included in and/or utilized with any other of FIGS. 1-15 without departing from the scope of the present disclosure.

As discussed, track saws 10 include workpiece support 300 in the form of base plate 304 that includes rib-receiving channel 324, which is configured to receive a raised elongate rib 44 of a track 42. Rib-receiving channel 324 may extend from arbor-opposed side 312 of base plate 304 and/or into the base plate. As perhaps best illustrated in FIGS. 10 and 13, rib-receiving channel 324 may extend between a leading edge 305 of base plate 304 and a trailing edge 306 of the base plate. Additionally or alternatively, rib-receiving channel 324 may extend parallel, or at least substantially parallel, to a planar blade surface 202 of circular saw blade 200 and/or may extend perpendicular to an axis of rotation 204 of the circular saw blade, as perhaps best illustrated in FIG. 10.

Track saws 10 also include at least one rib-guide assembly 328, and in some examples at least two rib-guide assemblies 328, as illustrated in FIG. 13, which at least partially define rib-receiving channel 324. Rib-guide assemblies 328 may be positioned on a blade-opposed side 326 of rib-receiving channel 324. When base plate 304 includes at least two rib-guide assemblies 328, a leading rib-guide assembly 329 may be positioned proximate a leading edge 305 of base plate 304. Additionally or alternatively, a trailing rib-guide assembly 330 may be positioned proximate a trailing edge 306 of the base plate.

Self-adjusting rib-guide assemblies 332, according to the present disclosure, automatically adjust for, self-adjust for, and/or accommodate variations in, or a range of, a raised rib transverse width 48 of raised elongate rib 44 of track 42, or track segments 46 thereof, as illustrated in FIGS. 11-12 and 14-15. More specifically, self-adjusting rib guide assemblies 332 are configured to automatically maintain a desired amount of clearance, tolerance, and/or contact between track saw 10 and raised elongate rib 44 over a range of raised rib transverse widths 48. This may include automatically maintaining the desired clearance, tolerance, and/or contact for variation in raised rib transverse width 48 between different tracks 42 and/or automatically maintaining the desired clearance, tolerance, and/or contact for variation in raised rib transverse width 48 along the length of a single, or a given, raised elongate rib 44 of a single, or a given, track 42, such as while the track saw is operatively translated along the length of the single track 42 and/or utilized to cut the workpiece. This may contrast to conventional track saws that, as discussed herein, may include and/or utilize a manual adjustment mechanism that is incapable of automatically accounting, or adjusting, for changes in raised rib transverse width 48.

Stated another way, self-adjusting rib-guide assembly 332 may be configured to automatically adjust a transverse width 336, a minimum transverse width, and/or a transverse cross-sectional area of a region of a rib-receiving channel that is defined by the self-adjusting rib-guide assembly, such as to accommodate the range of raised rib transverse widths. This is illustrated by the transition between the configurations that are illustrated in FIGS. 11 and 14 and the configurations that are illustrated in FIGS. 12 and 15.

As examples, self-adjusting rib-guide assembly 332 may be configured to automatically adjust for the range of raised rib transverse widths that varies by a threshold rib width variance. Examples of the threshold rib width variance include at least 0.05 millimeters (mm), at least 0.1 mm, at least 0.15 mm, at least 0.2 mm, at least 0.25 mm, at least 0.3 mm, at least 0.35 mm, at least 0.4 mm, at most 1 mm, at most 0.9 mm, at most 0.8 mm, at most 0.7 mm, at most 0.6 mm, at most 0.5 mm, at most 0.4 mm, at most 0.3 mm, and/or at most 0.2 mm.

This automatic adjustment may be accomplished in any suitable manner. As an example, a portion and/or region of self-adjusting rib-guide assembly 332 may be configured to automatically move, relative to a remainder of track saw 10, responsive to a contact force between the portion of the self-adjusting rib-guide assembly and the raised elongate rib. This may include automatic motion to accommodate, or adjust for, raised rib transverse width 48 of raised elongate rib 44. Additionally or alternatively, the portion and/or region of the self-adjusting rib-guide assembly may be biased to remain in contact with the raised elongate rib to accommodate, or adjust for, variations in raised rib transverse width 48. This adjustment is illustrated by the transition of self-adjusting rib-guide assembly 332 from the configuration that is illustrated in FIG. 11, in which the self-adjusting rib-guide assembly accommodates a relatively narrower raised rib transverse width 48, to the configuration that is illustrated in FIG. 12, in which the self-adjusting rib-guide assembly has moved to the left to accommodate a relatively narrower raised rib transverse width 48.

In a specific example, and as perhaps best illustrated in FIGS. 14-15, self-adjusting rib-guide assembly 332 may include a roller shaft 344, a guide roller 348, and a biasing mechanism 356. Roller shaft 344 may include and/or be a cylindrical, or an elongate cylindrical, roller shaft. Guide roller 348 may be configured to rotate about roller shaft 344, such as during motion of track saw 10 relative to the track. Guide roller 348 also may be configured to operatively translate along, or along a length of, roller shaft 344 between an extended state 360, as illustrated in FIG. 14, and a retracted state 364, as illustrated in FIG. 15. Extended state 360 may define a minimum, or a minimum value of, transverse width 336, while retracted state 364 may define a maximum, or a maximum value of, transverse width 336.

Biasing mechanism 356 may be configured to bias guide roller 348 toward and/or to extended state 360. However, insertion of a raised elongate rib, which has a transverse width that is greater than the minimum transverse width that is illustrated in FIGS. 11 and 14, may urge guide roller 348 toward retracted state 364, thereby adjusting, or automatically adjusting, transverse width 336. Biasing mechanism 356 also may urge guide roller 348 to extend and/or may permit the guide roller to retract, along a length of roller shaft 344, responsive to variation in raised rib transverse width 48 of a region of track 42 that contacts guide roller 348, such as may occur during translation of track saw 10 along the length of raised elongate rib 44 and/or during operative use of the track saw to cut the workpiece. Stated another way, biasing mechanism 356 may urge guide roller 348 to remain in contact with raised elongate rib 44, thereby increasing transverse width 336 responsive to a decrease in raised rib transverse width 48 and/or decreasing transverse width 336 responsive to an increase in raised rib transverse width 48. Additionally or alternatively, and upon removal of raised elongate rib 44 from rib-receiving channel 324, biasing mechanism 356 may urge guide roller 348 toward and/or to the extended state.

To facilitate the above-described functionality, guide roller 348 may include and/or be a tapered guide roller and/or an at least partially conic guide roller. Additionally or alternatively, guide roller 348 may taper toward arbor-opposed side 312 of base plate 304. Stated another way, a width of guide roller 348 may increase in a direction that extends from arbor-opposed side 312 and toward arbor-facing side 308.

A taper angle 350 for this taper, which is illustrated in FIG. 14, may have any suitable value. Examples of the taper angle include angles of at least 5 degrees, at least 7.5 degrees, at least 10 degrees, at least 12.5 degrees, at least 15 degrees, at least 17.5 degrees, at least 20 degrees, at least 22.5 degrees, at least 25 degrees, at least 27.5 degrees, at least 30 degrees, at most 45 degrees, at most 40 degrees, at most 35 degrees, at most 30 degrees, at most 27.5 degrees, at most 25 degrees, at most 22.5 degrees, and/or at most 20 degrees. A specific taper angle may be selected and/or based upon a strength, a restoring force, and/or a bias force applied to guide roller 348 by biasing mechanism 356, with lower angles being associated with weaker bias forces and greater angles being associated with stronger bias forces. The taper angle may open toward arbor-opposed side 312 of base plate 304, as also illustrated in FIG. 14.

Guide roller 348 may have, define, and/or include a central opening 352. Roller shaft 344 may extend within and/or through the central opening. Guide roller 348 may be formed and/or defined from any suitable guide roller material and/or materials. Examples of the guide roller material include a resilient material, a polymeric material, a polyurethane, and/or combinations thereof.

Biasing mechanism 356 may include and/or may be formed from any suitable material and/or materials. Examples of biasing mechanism 356 include a resilient material, a spring, and/or a coil spring.

In some examples of track saws 10, and as illustrated in FIGS. 11-12, track saws 10 and/or rib-guide assemblies 328 thereof also may include a manual adjustment mechanism 334. Manual adjustment mechanism 334, when present, may be configured to be actuated, by the user of the track saw, to manually adjust the transverse width of a corresponding region of rib-receiving channel 324. In some examples, manual adjustment mechanism 334 may be distinct, spaced apart, and/or separate from self-adjusting rib-guide assembly 332. In some such examples, the corresponding region of the rib-receiving channel may differ from the region of the rib-receiving channel that is adjusted by the self-adjusting rib-guide assembly. In some examples, the manual adjustment mechanism may form a portion of and/or may interact with self-adjusting rib-guide assemblies 332. In some such examples, the corresponding region of the rib-receiving channel may be the same as the region of the rib-receiving channel that is adjusted by the self-adjusting rib-guide assembly. In some such examples, the manual adjustment mechanism may be configured to adjust, such as to widen and/or narrow, the range of raised rib transverse widths 48 that may be accommodated, or adjusted for, by self-adjusting rib-guide assembly 332.

Figure 16:
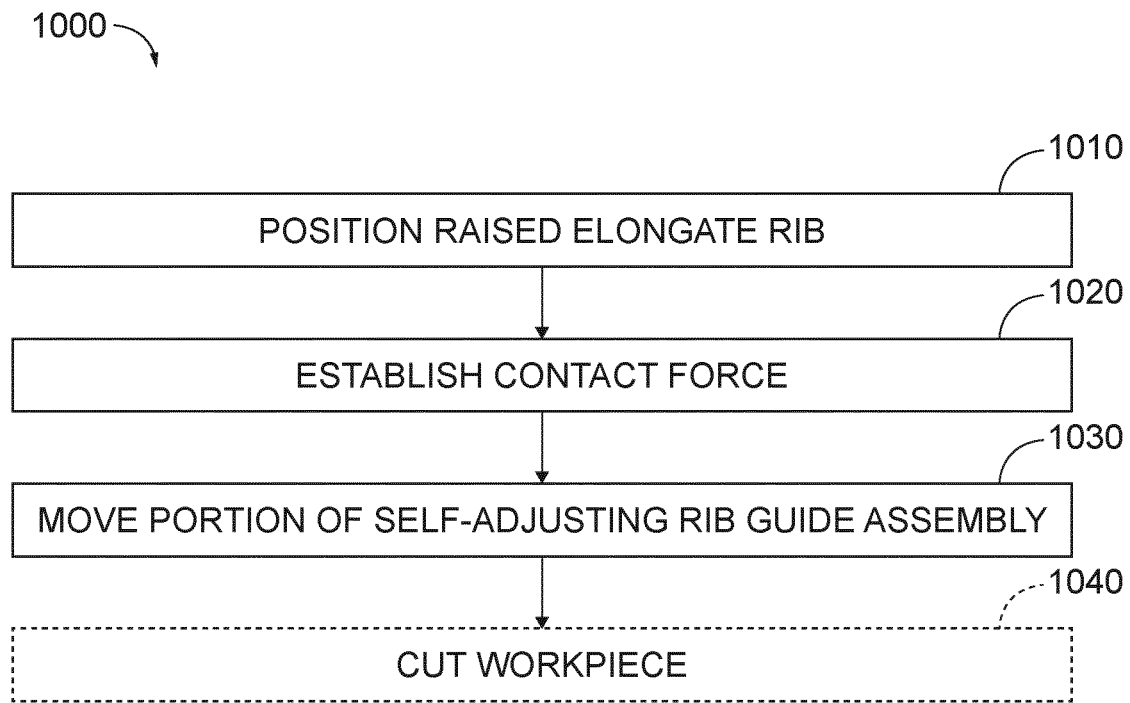
FIG. 16 is a flowchart depicting examples of methods of operating self-adjusting rib-guide assemblies, according to the present disclosure.

FIG. 16 is a flowchart depicting examples of methods 1000 of operating self-adjusting rib-guide assemblies, according to the present disclosure, such as self-adjusting rib-guide assemblies 332 of FIGS. 1 and 11-15. Methods 1000 may include operating and/or adjusting the self-adjusting rib-guide assemblies to automatically adjust for, or to automatically accommodate, a range of raised rib transverse widths of a raised elongate rib of a track that may be utilized with the track saw. Examples of the track saw are disclosed herein with reference to track saws 10. Examples of the track are disclosed herein with reference to tracks 42. Examples of the raised elongate rib are disclosed herein with reference to raised elongate ribs 44.

Methods 1000 include positioning the raised elongate rib at 1010 and establishing a contact force at 1020. Methods 1000 also include moving a portion of the self-adjusting rib-guide assembly at 1030 and may include cutting a workpiece at 1040.

Positioning the raised elongate rib at 1010 may include positioning the raised elongate rib within a rib-receiving channel of a base plate of the track saw. In some examples, the positioning at 1010 may include engaging the raised elongate rib with at least a portion of the rib-receiving channel, operatively engaging the raised elongate rib with at least a portion of the rib-receiving channel, and/or establishing physical contact between the raised elongate rib and at least a portion of the rib-receiving channel. In some examples, the positioning at 1010 may include engaging the raised elongate rib with at least the portion of the self-adjusting rib-guide assembly, operatively engaging the raised elongate rib with at least the portion of the self-adjusting rib-guide assembly, and/or establishing physical contact between the raised elongate rib and at least the portion of the self-adjusting rib-guide assembly.

Establishing the contact force at 1020 may include producing, generating, and/or establishing the contact force between the raised elongate rib and the self-adjusting rib-guide assembly. The establishing at 1020 may be during, responsive to, and/or a result of the positioning at 1010, such as via contact, or direct physical contact, between the raised elongate rib and the self-adjusting rib-guide assembly. Additionally or alternatively, the establishing at 1020 may include maintaining the contact force as the user pushes the track saw along the length of the track.

Moving the portion of the self-adjusting rib-guide assembly at 1030 may include moving at least the portion of the self-adjusting rib-guide assembly relative to a remainder of the track saw, such as while raised elongate rib is positioned within the rib-receiving channel and/or while the self-adjusting rib guide assembly is in contact with the raised elongate rib. This may include moving the portion of the self-adjusting rib-guide assembly to adjust for, to accommodate, and/or to permit the rib-receiving channel to receive the raised elongate rib of the track. The moving at 1030 may be during, responsive to, and/or a result of the contact force established during the establishing at 1020.

The moving at 1030 may be accomplished in any suitable manner. As an example, the self-adjusting rib-guide assembly may include a guide roller, such as guide roller 348. In some such examples, the establishing at 1020 may include establishing the contact force between the raised elongate rib and the guide roller, and the moving at 1030 may include moving the guide roller. In some such examples, the guide roller may include and/or be a tapered guide roller that defines a tapered region, and the moving at 1030 may include changing a portion of the tapered region that contacts the raised elongate rib. In some such examples, the guide roller may define an axis of symmetry, and the moving at 1030 may include operatively translating the guide roller along the axis of symmetry.

In some examples, the self-adjusting rib-guide assembly may include a roller shaft, and the guide roller may be configured to operatively rotate about the roller shaft. In some such examples, the moving at 1030 may include operatively translating the guide roller along, along at least a fraction of a length of, and/or along an elongate axis of the roller shaft.

In some examples, the self-adjusting rib-guide assembly may include a biasing mechanism. In some such examples, the moving at 1030 may include compressing the biasing mechanism. In a more specific example, the guide roller may be configured to operatively translate along the roller shaft and/or between an extended state and a retracted state, such as may be responsive to the contact force, to variations in the contact force, and/or to variations in the transverse width of the raised elongate rib. The extended state may define a minimum transverse width of a region of the rib-receiving channel that is at least partially defined by the self-adjusting rib-guide assembly, and the retracted state may define a maximum transverse width of the region of the rib-receiving channel that is at least partially defined by the self-adjusting rib-guide assembly. In some such examples, the biasing mechanism may be configured to bias, or to urge, the guide roller toward the extended state. In some such examples, the moving at 1030 includes moving the guide roller at least partially toward the retracted state, such as via overcoming a bias force of the biasing mechanism with the contact force.

Cutting the workpiece at 1040 may include cutting the workpiece with, via, and/or utilizing the track saw. The cutting at 1040 may include cutting the workpiece by operatively translating the track saw along a length of the raised elongate rib, such as to permit the track and/or the raised elongate rib to at least partially guide and/or direct the track saw during the cutting at 1040.

Methods 1000 may include performing the moving at 1030 concurrently with and/or responsive to the cutting at 1040. Stated another way, the moving at 1030 may include automatically moving the portion of the self-adjusting rib-guide assembly relative to the remainder of the track saw to maintain contact between the portion of the self-adjusting rib-guide assembly and the raised elongate rib, to maintain the contact force between the raised elongate rib and the self-adjusting rib-guide assembly, to maintain the contact force within a predetermined contact force range, and/or to maintain a desired tolerance between the track saw and the track via operative engagement between the self-adjusting rib-guide assembly and the raised elongate rib. This may include maintaining during and/or despite variation in the raised rib transverse width of a region of the raised elongate rib that contacts, or is in contact with, the portion of the self-adjusting rib-guide assembly.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

Illustrative, non-exclusive examples of track saws and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A1. A track saw, comprising:
- a motor including a motor shaft configured to rotate about a shaft rotational axis;
- an arbor configured to attach a circular saw blade to the track saw and to receive a torque from the motor when the motor shaft rotates about the shaft rotational axis;
- a base plate that defines an arbor-facing side and an arbor-opposed side, wherein the arbor-facing side of the base plate faces toward the arbor, wherein the base plate includes:
- (i) a rib-receiving channel defined on the arbor-opposed side of the base plate and configured to receive a raised elongate rib of a track; and
- (ii) a self-adjusting rib-guide assembly that at least partially defines the rib-receiving channel, wherein the self-adjusting rib-guide assembly is configured to automatically adjust for a range of raised rib transverse widths.

A2. The track saw of paragraph A1, wherein the base plate includes at least two self-adjusting rib-guide assemblies.

A3. The track saw of paragraph A2, wherein a leading rib-guide assembly of the at least two self-adjusting rib-guide assemblies is positioned proximate a leading edge of the base plate, and further wherein a trailing rib-guide assembly of the at least two self-adjusting rib-guide assemblies is positioned proximate a trailing edge of the base plate.

A4. The track saw of any of paragraphs A1-A3, wherein the self-adjusting rib-guide assembly is configured to automatically adjust a transverse width of a region of the rib-receiving channel that is at least partially defined by the self-adjusting rib-guide assembly.

A5. The track saw of paragraph A4, wherein the self-adjusting rib-guide assembly is configured to automatically adjust the transverse width to at least one of
- (i) accommodate the range of raised rib transverse widths; and (ii) maintain contact with the raised elongate rib as the track saw translates along the raised elongate rib of the track.

A6. The track saw of any of paragraphs A1-A5, wherein at least a portion of the self-adjusting rib-guide assembly is configured to automatically move, relative to a remainder of the track saw, responsive to a contact force between the portion of the self-adjusting rib-guide assembly and the raised elongate rib of the track and to accommodate a raised rib transverse width of the raised elongate rib.

A7. The track saw of any of paragraphs A1-A6, wherein the self-adjusting rib-guide assembly is biased to remain in contact with the raised elongate rib at least one of:
(i) as the track saw is utilized to cut a/the workpiece; and
(ii) as the track saw is operatively translated along a length of the raised elongate rib.

A8. The track saw of any of paragraphs A1-A7, wherein the self-adjusting rib-guide assembly is positioned on a blade-opposed side of the rib-receiving channel.

A9. The track saw of any of paragraphs A1-A8, wherein the self-adjusting rib-guide assembly includes a roller shaft, a guide roller, and a biasing mechanism.

A10. The track saw of paragraph A9, wherein the guide roller is configured to operatively rotate about the roller shaft.

A11. The track saw of paragraph A10, wherein the guide roller is configured to operatively translate along the roller shaft between an extended state, which defines a minimum transverse width of a/the region of the rib-receiving channel that is at least partially defined by the self-adjusting rib-guide assembly, and a retracted state, which defines a maximum transverse width of the region of the rib-receiving channel that is at least partially defined by the self-adjusting rib-guide assembly.

A11.1. The track saw of paragraph A11, wherein the biasing mechanism is configured to bias the guide roller toward the extended state.

A12. The track saw of any of paragraphs A9-A11.1, wherein the roller shaft includes an elongate cylindrical roller shaft.

A13. The track saw of any of paragraphs A9-A12, wherein the guide roller at least one of:
(i) includes a tapered guide roller;
(ii) includes an at least partially conic guide roller; and
(iii) tapers toward the arbor-opposed side of the base plate.

A14. The track saw of any of paragraphs A9-A13, wherein the guide roller defines a taper angle.

A15. The track saw of paragraph A14, wherein the taper angle is at least one of:
(i) at least 5 degrees, at least 7.5 degrees, at least 10 degrees, at least 12.5 degrees, at least 15 degrees, at least 17.5 degrees, at least 20 degrees, at least 22.5 degrees, at least 25 degrees, at least 27.5 degrees, or at least 30 degrees; and
(ii) at most 45 degrees, at most 40 degrees, at most 35 degrees, at most 30 degrees, at most 27.5 degrees, at most 25 degrees, at most 22.5 degrees, or at most 20 degrees.

A16. The track saw of any of paragraphs A14-A15, wherein the taper angle opens toward the arbor-opposed side of the base plate.

A17. The track saw of any of paragraphs A14-A16, wherein the taper angle is based, at least in part, on a bias force applied to the guide roller by the biasing mechanism.

A18. The track saw of any of paragraphs A9-A17, wherein the guide roller includes a central opening, and further wherein the roller shaft extends through the central opening.

A19. The track saw of any of paragraphs A9-A18, wherein the guide roller is defined by a guide roller material that includes, or is, at least one of:
(i) a resilient material;
(ii) a polymeric material; and
(iii) a polyurethane.

A20. The track saw of any of paragraphs A9-A19, wherein the biasing mechanism includes at least one of:
(i) a resilient material;
(ii) a spring; and
(iii) a coil spring.

A21. The track saw of any of paragraphs A1-A20, wherein the rib-receiving channel at least one of:
(i) extends between a/the leading edge of the base plate and a/the trailing edge of the base plate; and
(ii) extends parallel, or at least substantially parallel, to a planar blade surface of the circular saw blade.

A22. The track saw of any of paragraphs A1-A21, wherein the rib-receiving channel extends from the arbor-opposed side of the base plate and into the base plate.

A23. The track saw of any of paragraphs A1-A22, wherein the track saw further includes a manual adjustment mechanism configured to be actuated, by a user of the track saw, to manually adjust a/the transverse width of a corresponding region of the rib-receiving channel.

A24. The track saw of paragraph A23, wherein the manual adjustment mechanism is distinct from the self-adjusting rib-guide assembly.

A25. The track saw of paragraph A23, wherein the manual adjustment mechanism is configured to adjust the range of raised rib transverse widths accommodated by the self-adjusting rib-guide assembly.

A26. The track saw of any of paragraphs A1-A25, wherein the motor includes an electric motor.

A27. The track saw of any of paragraphs A1-A26, wherein the track saw further includes a gripping region configured to be gripped by a user of the track saw during operation of the track saw to cut a/the workpiece.

A28. The track saw of any of paragraphs A1-A27, wherein the track saw further includes a switch configured to selectively apply an electric current to at least one other component of the track saw.

A29. The track saw of any of paragraphs A1-A28, wherein the track saw further includes a blade guard configured to prevent contact between the user and the saw blade.

A30. The track saw of paragraph A29, wherein the blade guard includes a retractable region configured to retract when the track saw is utilized to cut a/the workpiece.

A31. The track saw of any of paragraphs A1-A30, wherein the track saw further includes at least one of:
(i) a power supply structure configured to electrically power the track saw;
(ii) a power cord configured to provide electric current to the track saw; and
(iii) a battery configured to provide electric current to the track saw.

A32. The track saw of any of paragraphs A1-A31, wherein the track saw is a plunge saw.

A33. The track saw of paragraph A32, wherein the arbor is operatively attached to the arbor-facing side of the base plate via a base plate pivot.

A34. The track saw of paragraph A33, wherein the arbor and the base plate are configured to operatively rotate, relative to one another, about the base plate pivot to selectively vary a region of the circular saw blade that extends on the arbor-opposed side of the base plate.

A35. The track saw of any of paragraphs A1-A34, wherein the track saw includes the circular saw blade.

A36. The track saw of paragraph A35, wherein the circular saw blade is operatively attached to the track saw via the arbor for rotational motion with the arbor.

A37. The track saw of any of paragraphs A1-A36, wherein the track saw further includes the track, and wherein the track includes the raised elongate rib.

B1. A method of operating a self-adjusting rib-guide assembly of a track saw to adjust for a range of raised rib transverse widths of a raised elongate rib of a track, the method comprising:

positioning the raised elongate rib within a rib-receiving channel of a base plate of the track saw;

during the positioning, establishing a contact force between the raised elongate rib and the self-adjusting rib-guide assembly; and responsive to the contact force, moving at least a portion of the self-adjusting rib-guide assembly relative to a remainder of the track saw to accommodate a raised rib transverse width of the raised elongate rib.

B2. The method of paragraph B1, wherein the positioning includes engaging the raised elongate rib with at least a portion of the rib-receiving channel.

B3. The method of any of paragraphs B1-B2, wherein the positioning includes engaging the raised elongate rib with at least the portion of the self-adjusting rib-guide assembly.

B4. The method of any of paragraphs B1-B3, wherein the method further includes cutting a workpiece by operatively translating the track saw along a length of the raised elongate rib.

B5. The method of paragraph B4, wherein, during the cutting, the moving includes automatically moving the portion of the self-adjusting rib-guide assembly relative to the remainder of the track saw to maintain contact between the portion of the self-adjusting rib-guide assembly and the raised elongate rib during variation in the raised rib transverse width of a region of the raised elongate rib that is in contact with the portion of the self-adjusting rib-guide assembly.

B6. The method of any of paragraphs B4-B5, wherein, during the cutting, the moving includes automatically moving the portion of the self-adjusting rib-guide assembly relative to the remainder of the track saw to maintain the contact force within a predetermined contact force range.

B7. The method of any of paragraphs B1-B6, wherein the self-adjusting rib-guide assembly includes a guide roller, wherein the establishing the contact force includes establishing the contact force between the raised elongate rib and the guide roller, and further wherein the moving the at least a portion of the self-adjusting rib-guide assembly includes moving the guide roller.

B8. The method of paragraph B7, wherein the guide roller is a tapered guide roller that defines a tapered region, and further wherein the moving includes changing a portion of the tapered region that contacts the raised elongate rib.

B9. The method of any of paragraphs B7-B8, wherein the guide roller defines an axis of symmetry, and further wherein the moving includes operatively translating the guide roller along the axis of symmetry.

B10. The method of any of paragraphs B7-B9, wherein the self-adjusting rib-guide assembly further includes a roller shaft, wherein the guide roller is configured to operatively rotate about the roller shaft, and further wherein the moving includes operatively translating the guide roller along the roller shaft.

B11. The method of paragraph B10, wherein the self-adjusting rib-guide assembly further includes a biasing mechanism, wherein the guide roller is configured to operatively translate along the roller shaft between an extended state, which defines a minimum transverse width of a region of the rib-receiving channel that is at least partially defined by the self-adjusting rib-guide assembly, and a retracted state, which defines a maximum transverse width of the region of the rib-receiving channel that is at least partially defined by the self-adjusting rib-guide assembly, wherein the biasing mechanism is configured to bias the guide roller toward the extended state, and further wherein the moving includes moving the guide roller at least partially toward the retracted state.

B12. The method of paragraph B11, wherein the moving includes compressing the biasing mechanism.

B13. The method of any of paragraphs B1-B12, wherein the track saw includes any structure of any of, or is, the track saws of any of paragraphs A1-A37.

INDUSTRIAL APPLICABILITY

The track saws disclosed herein are applicable to the power tool industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A track saw, comprising:
a motor including a motor shaft configured to rotate about a shaft rotational axis, the motor shaft including an arbor configured to attach a circular saw blade to the track saw and to receive a torque from the motor when the motor shaft rotates about the shaft rotational axis;
a base plate including an arbor-facing side and an arbor-opposed side, wherein the arbor-facing side of the base plate faces toward the arbor, wherein the base plate includes:
(i) a rib-receiving channel on the arbor-opposed side of the base plate and configured to receive a raised elongate rib of a track; and
(ii) a self-adjusting rib-guide assembly that at least partially forms the rib-receiving channel, wherein the self-adjusting rib-guide assembly is configured to adjust for a range of raised rib transverse widths;
wherein the self-adjusting rib-guide assembly includes a roller shaft, a guide roller, and a biasing mechanism;
wherein the guide roller is configured to operatively rotate about the roller shaft; and
wherein the guide roller is configured to operatively translate along the roller shaft between an extended state in which a minimum transverse width of a region of the rib-receiving channel is at least partially formed by the self-adjusting rib-guide assembly, and a retracted state in which a maximum transverse width of the region of the rib-receiving channel is at least partially formed by the self-adjusting rib-guide assembly, wherein the biasing mechanism is configured to bias the guide roller toward the extended state.

2. The track saw of claim 1, wherein the base plate includes at least two self-adjusting rib-guide assemblies.

3. The track saw of claim 2, wherein a leading rib-guide assembly of the at least two self-adjusting rib-guide assemblies is positioned proximate a leading edge of the base plate, and further wherein a trailing rib-guide assembly of the at least two self-adjusting rib-guide assemblies is positioned proximate a trailing edge of the base plate.

4. The track saw of claim 1, wherein at least a portion of the self-adjusting rib-guide assembly is configured to move, relative to the base plate of the track saw, responsive to a contact force between the portion of the self-adjusting rib-guide assembly and the raised elongate rib of the track and to adjust for a raised rib transverse width of the raised elongate rib.

5. The track saw of claim 1, wherein the guide roller at least one of:
(i) includes a tapered guide roller;
(ii) includes an at least partially conic guide roller; and
(iii) tapers toward the arbor-opposed side of the base plate.

6. The track saw of claim 1, wherein the motor is operatively attached to the arbor-facing side of the base plate via a base plate pivot, and further wherein the motor and the base plate are configured to operatively rotate, relative to one another, about the base plate pivot to selectively vary a region of the circular saw blade that extends on the arbor-opposed side of the base plate.

7. A method of operating a self-adjusting rib-guide assembly of a track saw to adjust for a range of raised rib transverse widths of a raised elongate rib of a track, the method comprising:
positioning the raised elongate rib within a rib-receiving channel of a base plate of the track saw;
during the positioning, establishing a contact force between the raised elongate rib and the self-adjusting rib-guide assembly; and
responsive to the contact force, moving at least a portion of the self-adjusting rib-guide assembly relative to the base plate of the track saw to accommodate a raised rib transverse width of the raised elongate rib;
wherein the self-adjusting rib-guide assembly includes a guide roller, wherein the establishing the contact force includes establishing the contact force between the raised elongate rib and the guide roller, and further wherein the moving the at least a portion of the self-adjusting rib-guide assembly includes moving the guide roller;
wherein the guide roller defines an axis of symmetry, and further wherein the moving includes operatively translating the guide roller along the axis of symmetry;
wherein the self-adjusting rib-guide assembly further includes a roller shaft, wherein the guide roller is configured to operatively rotate about the roller shaft, and further wherein the moving includes operatively translating the guide roller along the roller shaft; and
wherein the self-adjusting rib-guide assembly further includes a biasing mechanism, wherein the guide roller is configured to operatively translate along the roller shaft between an extended state in which a minimum transverse width of a region of the rib-receiving channel is at least partially formed by the self-adjusting rib-guide assembly, and a retracted state in which a maximum transverse width of the region of the rib-receiving channel is at least partially formed by the self-adjusting rib-guide assembly, wherein the biasing mechanism is configured to bias the guide roller toward the extended state, and further wherein the moving includes moving the guide roller at least partially toward the retracted state.

8. The method of claim 7, wherein the method further includes cutting a workpiece by operatively translating the track saw along a length of the raised elongate rib.

9. The method of claim 8, wherein, during the cutting, the moving includes moving the portion of the self-adjusting rib-guide assembly relative to the base plate of the track saw to maintain contact between the portion of the self-adjusting rib-guide assembly and the raised elongate rib during variation in the raised rib transverse width of a region of the raised elongate rib that is in contact with the portion of the self-adjusting rib-guide assembly.

10. The method of claim 8, wherein, during the cutting, the moving includes moving the portion of the self-adjusting rib-guide assembly relative to the base plate of the track saw to maintain the contact force within a predetermined contact force range.

11. The method of claim 7, wherein the guide roller is a tapered guide roller that defines a tapered region, and further wherein the moving includes changing a portion of the tapered region that contacts the raised elongate rib.

12. The method of claim 7, wherein the moving includes compressing the biasing mechanism.

* * * * *